US008805931B2

(12) United States Patent
Galvin, Jr. et al.

(10) Patent No.: US 8,805,931 B2
(45) Date of Patent: Aug. 12, 2014

(54) COLLABORATIVE SESSION RESOURCE ALLOCATION

(75) Inventors: James P. Galvin, Jr., Georgetown, KY (US); Jeremy B. Sussman, Bedford Hills, NY (US)

(73) Assignee: International Business Machines Corporation, Armonk, NY (US)

(*) Notice: Subject to any disclaimer, the term of this patent is extended or adjusted under 35 U.S.C. 154(b) by 751 days.

(21) Appl. No.: 12/398,599

(22) Filed: Mar. 5, 2009

(65) Prior Publication Data

US 2010/0228823 A1 Sep. 9, 2010

(51) Int. Cl.
*G06F 15/16* (2006.01)
(52) U.S. Cl.
USPC ........... 709/204; 709/202; 709/224; 709/205; 709/222
(58) Field of Classification Search
USPC .......................... 709/204, 202, 205, 224, 222
See application file for complete search history.

(56) References Cited

U.S. PATENT DOCUMENTS

| 5,617,539 | A | 4/1997 | Ludwig et al. |
| 6,310,941 | B1* | 10/2001 | Crutcher et al. ........... 379/88.17 |
| 7,814,426 | B2* | 10/2010 | Huesken et al. .............. 715/762 |
| 2004/0107256 | A1* | 6/2004 | Odenwald et al. ............ 709/205 |
| 2010/0005142 | A1* | 1/2010 | Xiao et al. .................... 709/204 |

* cited by examiner

*Primary Examiner* — Thu Nguyen
*Assistant Examiner* — Lan-Dai T Truong
(74) *Attorney, Agent, or Firm* — Cantor Colburn LLP; Ryan Lewis

(57) ABSTRACT

A method comprising, receiving a first collaborative session request including a first collaborative session parameter, determining whether the first collaborative session parameter is similar to a second collaborative session parameter associated with a second collaborative session request, processing the first collaborative session request responsive to determining that the first collaborative session parameter is not similar to the second collaborative session parameter, receiving an indicator of a first system asset used in the second collaborative session request responsive to determining that the first collaborative session parameter is similar to the second collaborative session parameter, associating the indicated first system asset with the first collaborative session request.

21 Claims, 3 Drawing Sheets

COLLABORATIVE SESSION RESOURCE ALLOCATION

BACKGROUND

The embodiments relate generally to collaborative user sessions, and more specifically to managing assets used in collaborative user sessions.

Collaborative sessions include the use of tools by users to collaborate in real-time over a network. The tools may include, for example, instant messaging, real-time file editing, video presentations, audio presentations, telephonic communications, video communications, and other types of single and multimedia interactive applications.

A typical session may include a number of users who interact using one or more tools. For example, a number of users may collaborate by a user presenting a document using a document sharing tool, while conducting a collaborative discussion using an audio/video tool. The session may be organized by a user who sends an invitation to the other users. The invitation may include identifiers of each session participant such as, for example, email addresses of the participants, the time of the session, the tools that will be used in the session, and an identifier of the session. At the scheduled session time, the participants may access the system using the identifier and join the session using various tools.

Systems used for collaborative sessions often include servers or multi-point control units (MCUs) that coordinate the session, perform processing of the collaborative tools and session data, and facilitate the networking of the participants. Particular MCUs may be limited to processing particular types of session tools. For example, one MCU on a system may be designed to process audio and video tools, while a second MCU may only process audio tools. An MCU includes a number of ports that may be used by a user to communicate with the MCU and participate in a session. Typically each participant in a session uses a port to participate in a session. An MCU is often an expensive component in a collaborative system, and the number of ports for a particular MCU may limit the number of users that may simultaneously participate in collaborative sessions. Organizations that use collaborative systems often reserve the MCU resources for a session when the invitation for the session is sent by a participant or administrator. For example, if a proposed session includes ten participants, ten MCU ports may be reserved at the scheduled session time for the session. The reserved MCU ports are not accessible during the scheduled session time for other sessions that may be desired by other users of the collaborative system. The session invitations are often sent well in advance of the scheduled session time, and the actual requirement for MCU port usage is difficult to predict. Thus, if three of the ten ports are not used during the session, they remain reserved and unused during the reserved time. In many instances, the unused ports may be desired by other system users for other sessions, but may not be accessed because they have been allocated through reservations for the first session.

SUMMARY

The shortcomings of the prior art are overcome and additional advantages are achieved through an exemplary method, comprising, receiving a first collaborative session request including a first collaborative session parameter, determining whether the first collaborative session parameter is similar to a second collaborative session parameter associated with a second collaborative session request, processing the first collaborative session request responsive to determining that the first collaborative session parameter is not similar to the second collaborative session parameter, receiving an indicator of a first system asset used in the second collaborative session request responsive to determining that the first collaborative session parameter is similar to the second collaborative session parameter, associating the indicated first system asset with the first collaborative session request.

A system comprising, a processor operative to receive a first collaborative session request including a first collaborative session parameter, determine whether the first collaborative session parameter is similar to a second collaborative session parameter associated with a second collaborative session request, process the first collaborative session request responsive to determining that the first collaborative session parameter is not similar to the second collaborative session parameter, receive an indicator of a first system asset used in the second collaborative session request responsive to determining that the first collaborative session parameter is similar to the second collaborative session parameter, associate the indicated first system asset with the first collaborative session request.

DETAILED DESCRIPTION

Figure 1A:
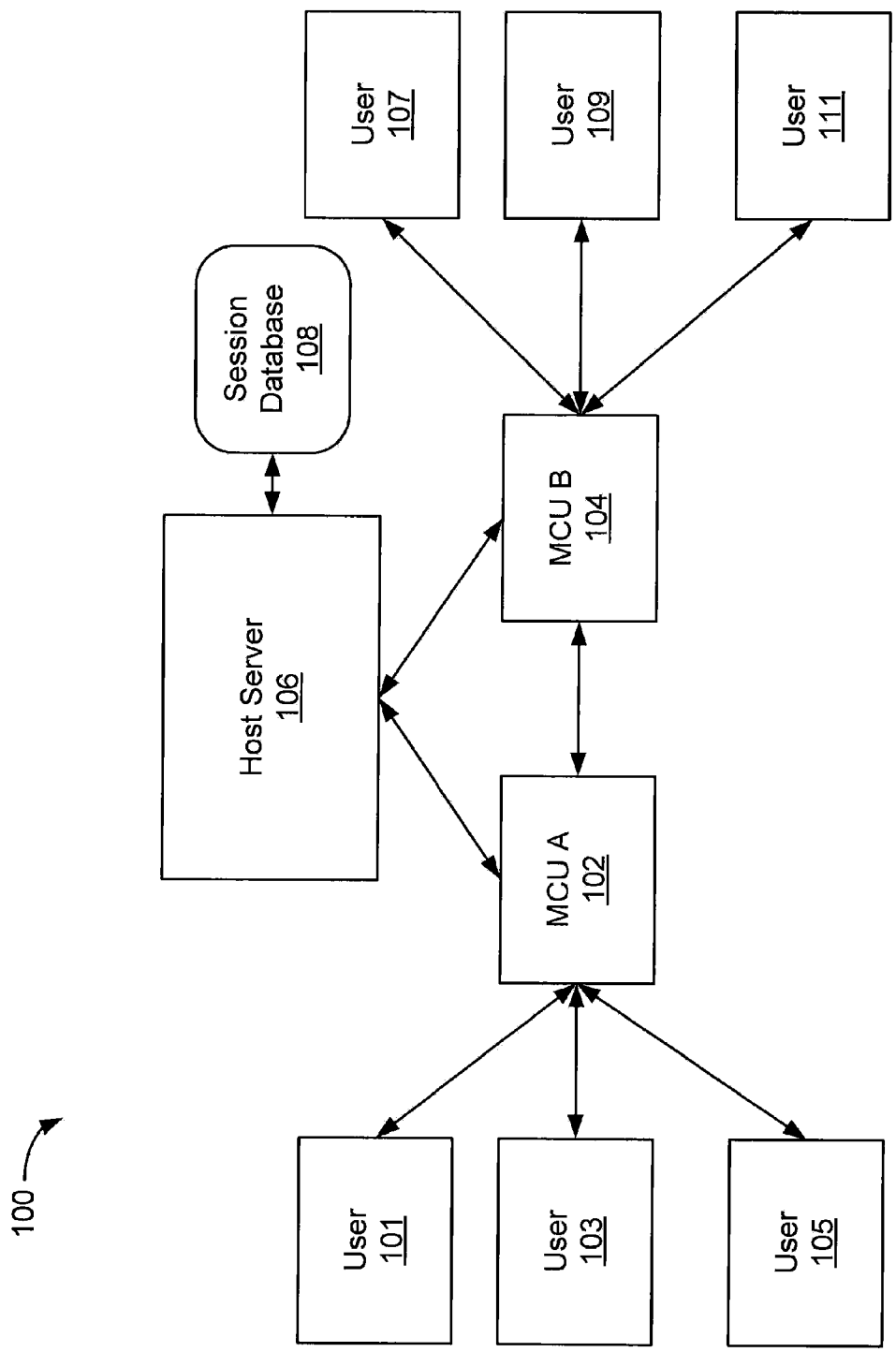
FIGS. 1A and 1B illustrate a high-level block diagram of an exemplary embodiment collaborative user system.
Figure 1B:
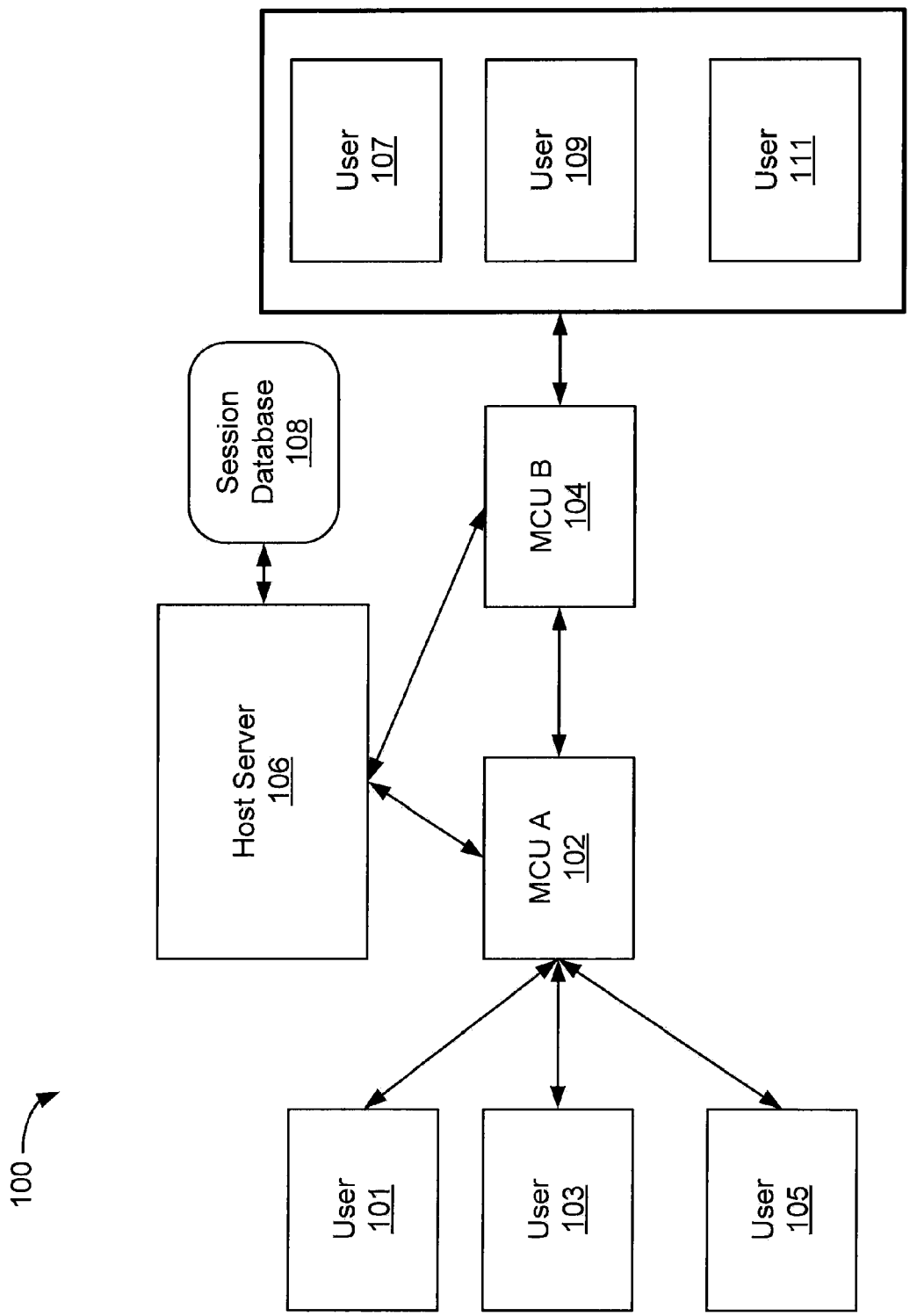

FIG. 1A illustrates an exemplary embodiment of a collaborative user system. The system 100 includes an MCU A 102 and an MCU B 104. The MCUs may include, for example, any type of processor or server that may process session applications and data over a communicative network. Users 101, 103, and 105 are communicatively connected to the ports of the MCU A 102, while users 107, 109, and 111 communicatively connected to the ports of the MCU B 104. The MCU A 102 and MCU B 104 are communicatively connected and may facilitate a collaborative session between the users. The illustrated embodiment includes a host server 106 that may be used to coordinate the session. The host server 106 may be an MCU. Alternate embodiments may use a single MCU to perform the host server 106 functions. Other alternate embodiments may include any number of MCUs and any number of users.

In operation, a session invitation may be sent by one of the users, or an administrator to each of the users. The session invitation may include session parameters such as, for example, a unique identifier of each user, a scheduled time of the session, collaborative tools that will be used in the session, and an identifier of the session. The host server 106 may then reserve six ports in the system 100 for the scheduled session time. During the scheduled session time, the reserved ports may not be used by users who are not participants in the scheduled session. Thus, if other users desire to conduct a second session that is scheduled during the scheduled session time, the six ports are unavailable to the other users.

An MCU port is a communicative connection to the MCU. A user often connects and participates in a session using a personal coMCUter or other communicative device via an MCU port. In a given system, the number of connections to the system are often limited by the number of MCU ports in the system. Different MCUs may also have different capabilities with respect to the session tools that may be processed by the MCU. For example, the MCU A 102 may be capable of processing video and audio tools, while the MCU B 104 may be capable of only processing audio tools. The capabilities of the MCUs and the tools that are desired for a session are asset parameters considered when the ports for a session are reserved and allocated.

The unpredictable human element present in the use of collaborative systems often contributes to an inefficient allocation of the resources of a collaborative system. For example, referring to FIG. 1A, an exemplary session invitation is sent by the user 101 to the other users (103, 105, 107, 109, and 111). The session invitation includes a unique identifier of each participant (e.g., an email address); the planned collaborative tools to be used in the session, in this example, audio/video and instant messaging; the time of the session, in this example 1200 GMT; and an identifier of the session, in this example "Strategic Planning" The session invitation is sent to each of the participants (the users) and to the host server 106. The host server 106 processes the invitation by determining what collaborative tools that will be used in the session, and what MCUs in the system 100 are capable of processing the requested collaborative tools. The host server 106 may then reserve ports on the appropriate MCUs for each of the participants. In this example, the host server 106 reserves three ports on the MCU A 102 and three ports on the MCU B 104. Once the session time is reached the reserved ports are only available to the invited users, and may not be used for other users of other collaborative sessions.

Though six ports are reserved for the session, in many instances all of the reserved ports are not used. Referring to FIG. 2A, in the illustrated example, the users 107, 109, and 111 have connected to a single port of the MCU B 104. The illustrated example represents a typical scenario where a number of invited users share a port—by for example, gathering in a single conference room and connecting via a single port from the conference room. In the illustrated example, there are two unused reserved ports in MCU B 104. Though the illustrated example represents a scenario where some ports are unused, other resources may be inefficiently allocated if the proposed tools for the collaborative session are not used. Since MCUs in a system often have different capabilities with respect to the types of collaborative tools that may be processed with each particular MCU, the allocation and reservation of ports for a collaborative session is often determined by the tools that are expected to be used in the session. If for example, the MCU B is capable of processing audio and video, but the users 107, 109 and 111, do not use the video capability, the port used in MCU B may be better allocated to a collaborative session that uses the audio and video, while the users 107, 109 and 111 may have been allocated a port on an MCU that only processes audio.

The system and methods described below offer a more efficient allocation of collaborative system resources. Though a system cannot predict the parameters that will be associated with a particular collaborative session invitation, once a session has taken place, the system may save what assets where actually used in the session by the users. Once this data is compiled, it may be used to more accurately predict the actual collaborative system assets that will be used in a similar session, and allocate resources based on the prediction, thereby more efficiently allocating the collaborative system resources.

Figure 2:
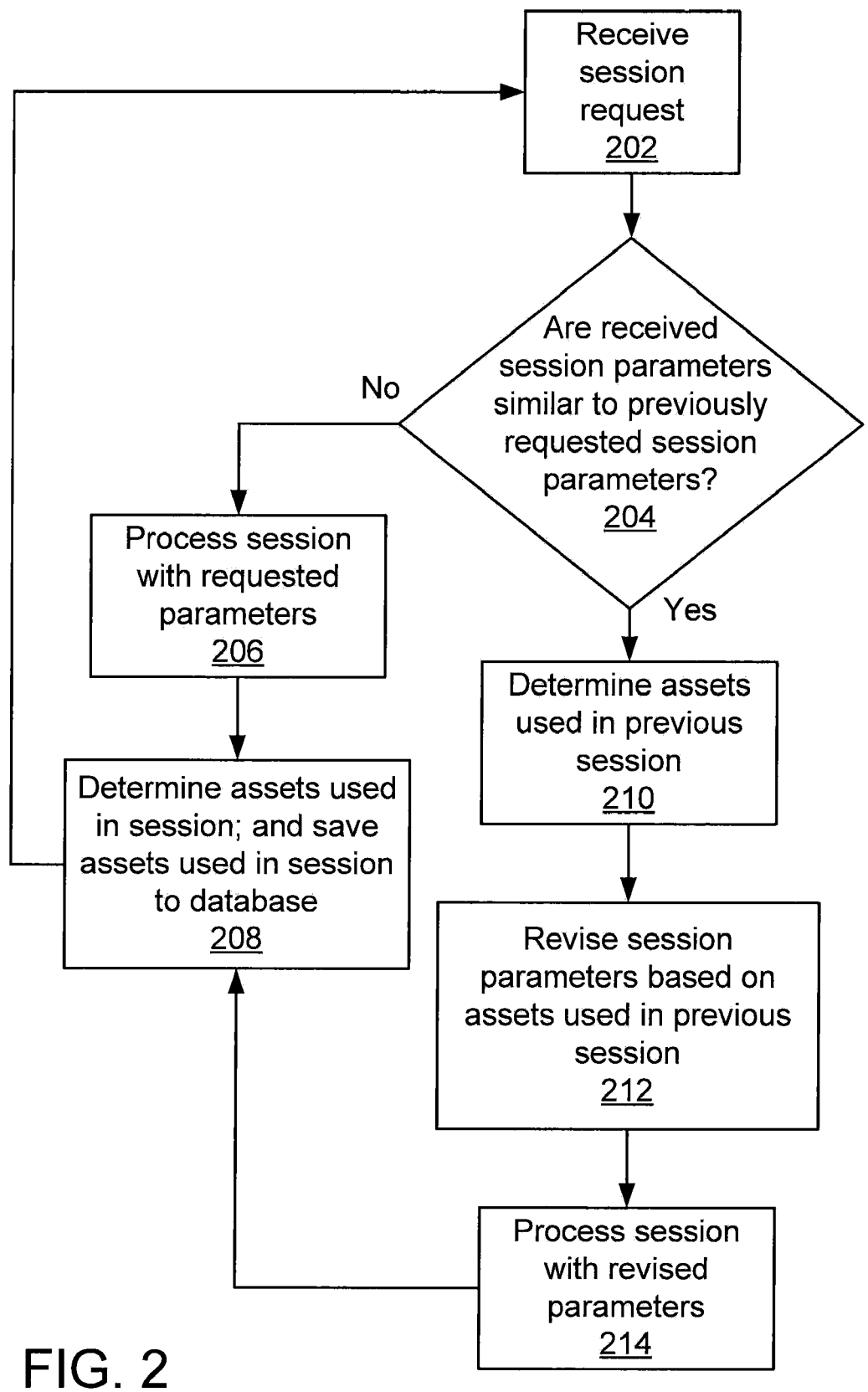
FIG. 2 illustrates block diagram of an exemplary method for allocating collaborative system resources.

FIG. 2 illustrates a block diagram of a method for efficiently allocating collaborative system resources. In block 202, a session request is received. The session request may include, for example, an invitation from a user or administrator to other users (participants), and session parameters such as, unique identifiers of the users, the collaborative tools that will be used in the session, a unique identifier of the session, and the scheduled time of the session. In block 204, the session parameters are compared to other session parameters from previous session requests. If the session parameters are not similar to previous session request parameters, the session is processed in block 206. The processing includes allocating and reserving system assets and conducting the session at the scheduled session time. In block 208, the actual assets used in the conducted session are determined and saved in a database. If the requested session parameters are similar to previous session request parameters, the assets actually used in the previous sessions are determined. The session parameters are revised based on the determined previous session parameters in block 212. In block 214, the session is processed using the revised session parameters. The processing may include reserving the assets corresponding to the revised session parameters and initializing and processing the session.

The technical effects and benefits of the above-described systems and methods provide an efficient method for allocating system resources in a collaborative system.

Example embodiments may be implemented, in software, for example, as any suitable computer program. For example, a program in accordance with one or more example embodiments may be a computer program product causing a computer to execute one or more of the example methods described herein: a method for simulating arbitrary software and/or unmodified code directly on a host processor.

The computer program product may include a computer-readable medium having computer program logic or code portions embodied thereon for enabling a processor of the apparatus to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

These programs may also be provided in the form of an externally supplied propagated signal and/or a computer data signal (e.g., wireless or terrestrial) embodied in a carrier wave. The computer data signal embodying one or more instructions or functions of an example methodology may be carried on a carrier wave for transmission and/or reception by an entity that executes the instructions or functions of the example methodology. For example, the functions or instructions of the example embodiments may be implemented by processing one or more code segments of the carrier wave, for example, in a computer, where instructions or functions may be executed for simulating arbitrary software and/or unmodified code directly on a host processor, in accordance with example embodiments.

Further, such programs, when recorded on computer-readable storage media, may be readily stored and distributed. The storage medium, as it is read by a computer, may enable the simulation of arbitrary software and/or unmodified code directly on a host processor, in accordance with the example embodiments.

Example embodiments being thus described, it will be obvious that the same may be varied in many ways. For example, the methods according to example embodiments may be implemented in hardware and/or software. The hardware/software implementations may include a combination of processor(s) and article(s) of manufacture. The article(s) of manufacture may further include storage media and executable computer program(s), for example, a computer program product stored on a computer readable medium.

The executable computer program(s) may include the instructions to perform the described operations or functions. The computer executable program(s) may also be provided as part of externally supplied propagated signal(s). Such variations are not to be regarded as departure from the spirit and scope of the example embodiments, and all such modifications as would be obvious to one skilled in the art are intended to be included within the scope of the following claims.

Although example embodiments have been discussed herein with regard to specific applications and/or implementations, it will be understood that example embodiments may be utilized in, for example, in firm ASIC chip design or implemented in traditional circuitry.

Although example embodiments have been shown and described with regard to certain operations (e.g., S114, S116, and/or S118 of FIG. 2) being performed serially or consecutively, it will be understood that any combination of these operations may be performed simultaneously and in parallel.

Although specific aspects may be associated with specific example embodiments, as described herein, it will be understood that the aspects of the example embodiments, as described herein, may be combined in any suitable manner.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for allocating collaborative system resources, comprising:
receiving, with a processor, a collaborative session request including one or more session parameters;
comparing the session parameters to one or more previous session parameters associated with a previous collaborative session request in order to determine whether the session parameters are similar to the previous session parameters; and
allocating a first system asset used in a previous collaborative session associated with the previous collaborative session request for use in a collaborative session associated with the collaborative session request responsive to determining that the session parameters are similar to the previous session parameters, wherein a second system asset that was not used in the previous collaborative session is not allocated although the second system asset is indicated by the session parameters.

2. The method of claim 1, wherein at least one selected from the first system asset and the second system asset is a communication connection.

3. The method of claim 1, wherein at least one selected from the first system asset and the second system asset is a collaborative tool.

4. A system for allocating collaborative system resources, comprising:
a host server configured to receive a first collaborative session request including a first set of session parameters, facilitate a first collaborative session, identify system assets used in the first collaborative session, associate the identified system assets used in the first collaborative session with the first set of session parameters, save the association of the identified system assets used in the first collaborative session with the first set of session parameters in a database, receive a second collaborative session request including a second set of session parameters, determine whether the second set of session parameters is similar to the first set of session parameters, and revise the second set of session parameters based on the identified system assets used in the first collaborative session responsive to determining that the second set of session parameters is similar to the first set of session parameters;
one or more memories;
wherein a second system asset that was not used in the previous collaborative session is not allocated although the second system asset is indicated by the second set of session parameters.

5. The system of claim 4, wherein the host server is further configured to allocate system assets corresponding to the revised set of session parameters in a second collaborative session corresponding to the second collaborative session request.

6. The system of claim 5, wherein the allocated system assets include a system asset that does not correspond to the second set of session parameters based on the system asset corresponding to the revised set of session parameters.

7. The system of claim 5, wherein the allocated system assets omit a system asset the corresponds to the second set of session parameters based on the system asset not corresponding to the revised set of session parameters.

8. The system of claim 5, wherein the identified system assets include at least one a communication connection.

9. A computer program product for allocating collaborative system resources, the computer program product comprising:
a non-transitory computer readable storage medium having computer executable instructions embodied therewith that, as executed on a computer apparatus, causes the computer apparatus implements a method, the method comprising:

receiving a first collaborative session request including a first set of session parameters;

facilitating a first collaborative session;

identifying system assets used in the first collaborative session;

associating the identified system assets used in the first collaborative session with the first set of session parameters;

saving the association of the identified system assets used in the first collaborative session with the first set of session parameters in a database;

receiving a second collaborative session request including a second set of session parameters;

determining whether the second set of session parameters is similar to the first set of session parameters; and revising the second set of session parameters based on the identified system assets used in the first collaborative session responsive to determining that the second set of session parameters is similar to the first set of session parameters;

wherein a second system asset that was not used in the previous collaborative session is not allocated although the second system asset is indicated by the second set of session parameters.

10. The computer program product of claim 9, wherein the computer executable instructions, as executed on a computer apparatus, further implement allocating system assets corresponding to the revised set of session parameters in a second collaborative session corresponding to the second collaborative session request.

11. The computer program product of claim 10, wherein allocating system assets includes allocating a system asset that does not correspond to the second set of session parameters based on the system asset corresponding to the revised set of session parameters.

12. The computer program product of claim 10, wherein allocating system assets includes determining not to allocate a system asset the corresponds to the second set of session parameters based on the system asset not corresponding to the revised set of session parameters.

13. The computer program product of claim 9, wherein the identified system assets include at least one communication connection.

14. A method for allocating collaborative system resources, comprising:

receiving, with a processor, a first collaborative session request including a first set of session parameters;

facilitating a first collaborative session;

identifying system assets used in the first collaborative session;

associating the identified system assets used in the first collaborative session with the first set of session parameters;

saving the association of the identified system assets used in the first collaborative session with the first set of session parameters in a database;

receiving a second collaborative session request including a second set of session parameters;

determining whether the second set of session parameters is similar to the first set of session parameters; and revising the second set of session parameters based on the identified system assets used in the first collaborative session responsive to determining that the second set of session parameters is similar to the first set of session parameters;

wherein a second system asset that was not used in the previous collaborative session is not allocated although the second system asset is indicated by the second set of session parameters.

15. The method of claim 14, further comprising allocating system assets corresponding to the revised set of session parameters in a second collaborative session corresponding to the second collaborative session request.

16. The method of claim 15, wherein allocating system assets includes reserving system assets corresponding to the revised set of session parameters for the second collaborative session.

17. The method of claim 15, further comprising processing the second collaborative session request using the revised set of session parameters instead of the second set of session parameters.

18. The method of claim 15, wherein allocating system assets includes allocating a system asset that does not correspond to the second set of session parameters based on the system asset corresponding to the revised set of session parameters.

19. The method of claim 15, wherein allocating system assets includes determining not to allocate a system asset the corresponds to the second set of session parameters based on the system asset not corresponding to the revised set of session parameters.

20. The method of claim 14, wherein the identified system assets include at least one communication connection.

21. The method of claim 14, wherein the identified system assets include at least one collaborative tool.

* * * * *